US007559470B2

(12) United States Patent
Yamane

(10) Patent No.: US 7,559,470 B2
(45) Date of Patent: Jul. 14, 2009

(54) POSITIONING CONTROLLING APPARATUS, POSITIONING CONTROL METHOD, PROGRAM FOR MAKING COMPUTER EXECUTE THIS METHOD, IMAGE FORMING APPARATUS, AND RECORDING MEDIUM

(75) Inventor: Jun Yamane, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 516 days.

(21) Appl. No.: 11/421,592

(22) Filed: Jun. 1, 2006

(65) Prior Publication Data

US 2007/0001010 A1 Jan. 4, 2007

(30) Foreign Application Priority Data

Jun. 29, 2005 (JP) ............................. 2005-190491

(51) Int. Cl.
*G06K 7/06* (2006.01)
*H02P 1/04* (2006.01)
*H02P 5/00* (2006.01)

(52) U.S. Cl. .................... 235/441; 235/462.2; 235/440; 235/472.01; 318/461; 318/638

(58) Field of Classification Search ............. 235/462.2, 235/420, 431, 470, 440, 441, 472.01; 318/461, 318/432, 638
See application file for complete search history.

(56) References Cited

U.S. PATENT DOCUMENTS 6,114,818 A * 9/2000 Ohtsubo et al. ............... 318/49
7,436,146 B2 * 10/2008 Shim et al. .................. 318/685
2001/0024101 A1 * 9/2001 Tanaka ........................ 318/800
2003/0178958 A1 * 9/2003 Akiyama .................... 318/280

FOREIGN PATENT DOCUMENTS

| | | |
|---|---|---|
| JP | 3271440 | 1/2002 |
| JP | 2002-91264 | 3/2002 |
| JP | 2003-61377 | 2/2003 |
| JP | 2005-37998 | 2/2005 |

OTHER PUBLICATIONS

U.S. Appl. No. 11/421,592, filed Jun. 1, 2006, Yamane.
U.S. Appl. No. 11/422,755, filed Jun. 7, 2006, Yamane.

* cited by examiner

*Primary Examiner*—Thien M. Le
*Assistant Examiner*—Tuyen K Vo
(74) *Attorney, Agent, or Firm*—Oblon, Spivak, McClelland, Maier & Neustadt, P.C.

(57) ABSTRACT

A positioning controlling apparatus includes: a current speed calculator that calculates a current speed of a conveyor belt from a detected moving distance; a position determining unit that determines the position of a conveyor belt for determining its stop position also from the detected moving distance; a gain switch having a plurality of gains; a target speed calculator that inputs a gain obtained by switching, and calculates a target speed of the conveyor belt; a speed error calculator that calculates an error between a calculated target speed and a calculated current speed; and an automatic controller that controls a drive motor by using a speed error. When the position determining unit determines that the conveyor belt is in the positioning area, the gain switch performs positioning while switching plural gains and outputting it.

20 Claims, 7 Drawing Sheets

PRIOR ART

POSITIONING CONTROLLING APPARATUS, POSITIONING CONTROL METHOD, PROGRAM FOR MAKING COMPUTER EXECUTE THIS METHOD, IMAGE FORMING APPARATUS, AND RECORDING MEDIUM

CROSS-REFERENCE TO RELATED APPLICATIONS

The present document incorporates by reference the entire contents of Japanese priority document, 2005-190491 filed in Japan on Jun. 29, 2005.

BACKGROUND OF THE INVENTION

1. Field of the Invention

The present invention relates to a positioning controlling apparatus, a positioning control method, a program for making a computer execute this method, an image forming apparatus, and a recording medium.

2. Description of the Related Art

In recent years, it is a very important task, from a viewpoint of image quality, to accurately move a paper conveying system by a desired distance and stop the system at this position, in an image forming apparatus such as a copying machine and a printer, particularly, in an image forming apparatus having an inkjet printing mechanism.

There has been developed a technique of decreasing the cost of generating a circuit and facilitating a change in control design, by digital control of software process using a low-cost general-purpose central processing unit (CPU) and a low-cost digital signal processor (DSP) in place of an analog control circuit.

A moved amount of a paper conveyor roller system that conveys recording paper in the above image forming apparatuses can be obtained at a relatively low cost, by obtaining information corresponding to a rotation angle of the conveyor roller, with a rotary encoder fitted to the conveyor roller. The encoder generates pulses with the edges settled beforehand. While the encoder includes an analog type and a digital type, the digital type encoder can stably obtain rotation angle information with a sensor. Precision of the obtained rotation angle information depends on resolution of the encoder.

FIG. 6 is an explanatory diagram of motor control of a paper conveying system performed by a conventional positioning controlling apparatus. In a paper conveyor belt apparatus 7, a drive roller 372 connected to a timing belt 470 from a motor 270 rotates to move a conveyor belt 371. A rotary encoder 571 is set on the drive roller 372.

A sensor 572 detects an output from a rotary encoder 571. A positioning controlling apparatus 17 outputs an obtained control instruction to a motor 270, based on position information detected by the sensor 572, and applies torque to the motor 270. The control instruction has a different format depending on a motor driver, such as a current instruction and a voltage instruction.

A control algorithm of this motor control includes a speed feedback control up to a position near a target value, and a position feedback control which is performed near a stop position. In the speed feedback control, the controlling apparatus measures a current speed and controls the current speed to make the difference between the current speed and a target speed zero.

In the position feedback control, the controlling apparatus multiplies a predetermined gain to a difference between the current position and the target position, thereby obtaining a target speed. The controlling apparatus performs a speed feedback based on the target speed, thereby simultaneously setting the speed and the position difference to zero.

However, near a stop position, behavior of the system based on the same instruction is different, depending on a twist of a rotation axis such as a motor axis, a drive roller axis, and a pulley to which each belt is applied. This behavior is greatly affected when the twist becomes large. Particularly, the behavior is different depending on a rotation direction of the system.

Torque is applied to the system in a direction returning from the twist. Therefore, it is not necessary to output an instruction to apply large torque in this direction. When torque larger than is necessary is applied, oscillation can be generated. On the other hand, relatively large torque needs to be applied in a direction opposite to the direction of returning from the twist. When this torque is small, time of converging to a target position can be delayed.

However, conventionally, it is not necessary to perform such a fine control in a sub-scan direction. This is because image degradation due to a "blur" of an image forming material such as ink at the image formation time, is more prominent than the positioning deviation, thereby overlooking the precision in positioning in the sub-scan direction. However, recently, ink for an inkjet printer has high granularity to meet a demand for an improved image quality. As a result, high precision is also required for paper feeding in the sub-scan direction.

In a conventional image forming apparatus such as an inkjet printer, a high-precision position deviation correction has not been particularly necessary as explained above. Therefore, there are few conventional examples of high-precision position correction. In other technical field, a positioning control technique in a servo control method for driving a feed rod of machine tool is proposed in Japanese Patent Specification No. 3271440. According to this servo control method for driving a feed rod of machine tool, in order to correct a positioning error due to a backlash, a state switching time is predicted by taking a delay in a position instruction and a position output into consideration, and a servo control is performed by switching an integration time constant.

However, the technique disclosed in Japanese Patent Specification No. 3271440 is applied for cutting metal or the like having high hardness in the machine tool and solves a similar problem in a technique assuming occurrence of a huge torque. Therefore, this technique is not suitable to control the behavior of a speed change near a stop position, as a method of correcting a positional deviation of a rotation axis of a general image forming apparatus in which a large torque like metal cutting does not occur.

SUMMARY OF THE INVENTION

The present invention has been proposed for coping with the aforementioned conventional problems, and it is an object of the present invention to at least partially solve the problems in the conventional technology.

According to one aspect of the present invention, a positioning controlling apparatus, which controls a stop position of a conveyor of a conveying apparatus, wherein the conveying apparatus includes a driving unit for driving a rotation axis and the conveyor for conveying a conveyed object based on rotation of the rotation axis driven by the driving unit, is constructed such that it includes: a moving distance detector that measures a moving distance of the conveyor; a current speed calculator that calculates a current speed of the conveyor, from a moving distance detected by the moving distance detector; a position determining unit that determines whether the conveyor is in a positioning area for determining the stop position, from the moving distance detected by the moving distance detector; a target speed calculator that inputs a gain to be multiplied to a current speed calculated by the current speed calculator, and calculates a target speed of the conveyor; a gain switch that has a plurality of the gains to be used by the target speed calculator, and outputs a gain to the target speed calculator while switching between the gains, when the position determining unit determines that the conveyor is in the positioning area; a speed error calculator that calculates an error between a target speed calculated by the target speed calculator and a current speed calculated by the current speed calculator; and a controller that controls the driving unit, by using a speed error calculated by the speed error calculator.

According to another aspect of the present invention, a positioning controlling method for controlling a stop position of a conveyor, which carries an object to be conveyed and is moved based on rotation of a rotation axis driven by a driving unit, includes: detecting a moving distance of the conveyor; calculating a current speed of the conveyor, from a moving distance obtained at the detecting; determining whether the conveyor is in a positioning area for determining the stop position, from a moving distance obtained at the detecting; calculating a target speed of the conveyor by inputting a gain to be multiplied to a current speed obtained at the calculating of a current speed; outputting a gain to be used at the calculating of a target speed while switching between a plurality of gains, when the conveyor is determined to be in the positioning area at the determining, by selecting one of the plurality of gains; calculating an error between a target speed obtained at the calculating of a target speed and a current speed obtained at the calculating of a current speed; and controlling the driving unit, by using a speed error obtained at the calculating of a speed error.

According to still another aspect of the present invention, a computer-readable recording medium is constructed such that it stores therein a computer program that causes a computer to execute the above-disclosed positioning controlling method.

According to still another aspect of the present invention, an image forming apparatus is constructed such that it includes an image processing apparatus that inputs image information and processes the input image, an image output apparatus that outputs an image on recording paper following image information obtained by the image process performed by the image processing apparatus, a conveying apparatus having a driving unit that drives a rotation axis, and a conveyor that conveys the recording paper based on rotation of the rotation axis driven by the driving unit, and a positioning controlling apparatus that controls the conveying apparatus to convey the recording paper to a position where the image output apparatus outputs an image on the recording paper, wherein the positioning controlling apparatus is constructed as mentioned above.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a positioning controlling apparatus, a positioning control method, a program for making a computer execute this method, an image forming apparatus, and a recording medium according to the present invention will be explained in detail below with reference to the accompanying drawings. The embodiments are explained according to first and second embodiments, and a plurality of modifications.

A positioning controlling apparatus and a paper conveying apparatus using this positioning controlling apparatus according to the first embodiment are explained in detail below. The paper conveying apparatus conveys paper, using the positioning controlling apparatus that moves a conveyor belt in a sub-scan direction by a predetermined distance, in an inkjet image forming apparatus.

Figure 1:
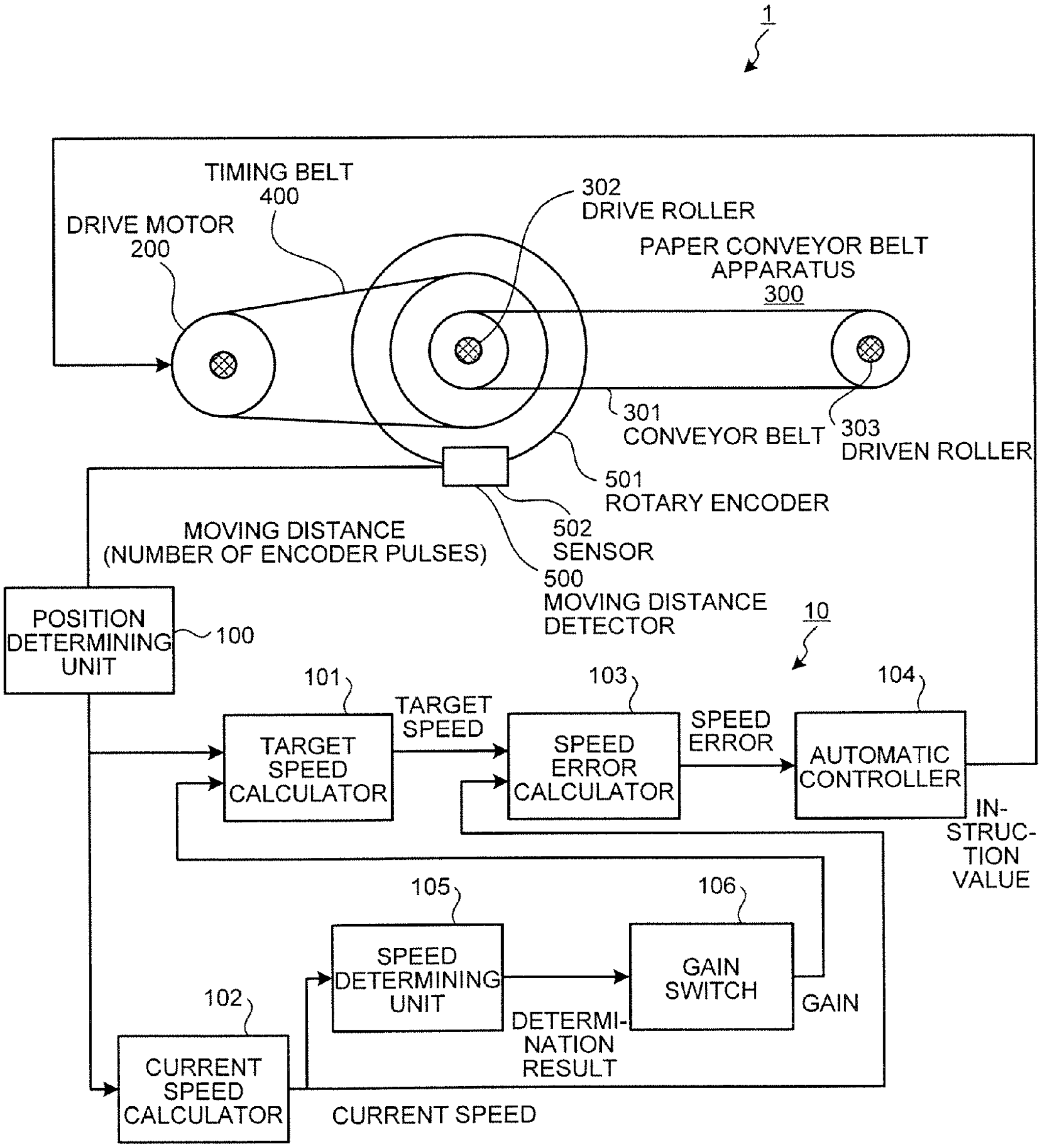
FIG. 1 is a functional block diagram of a paper conveying apparatus according to a first embodiment of the present invention.

FIG. 1 is a functional block diagram of the paper conveying apparatus according to the first embodiment. A paper conveying apparatus 1 according to the first embodiment includes a digital speed controlling apparatus 10, a paper conveyor belt apparatus 300, and a moving distance detecting apparatus 500.

The paper conveyor belt apparatus 300 has a drive motor 200, a conveyor belt 301, a drive roller 302, a driven roller 303, and a timing belt 400. The drive motor 200 rotates the drive roller 302 via the timing belt 400. The drive roller 302 rotatably supports a conveyor belt 301 with the drive roller 302 and a driven roller 303, thereby rotating the conveyor belt 301. The drive motor 20 uses a direct current motor, for example.

The moving distance detector 500 has a rotary encoder 501 and a sensor 502. The moving distance detector 500 detects a current moving distance of the conveyor belt 301. The moving distance detector 500 can be a digital rotary encoder fitted to the drive motor 200, a rotary encoder fitted to the drive roller 302, a linear encoder fitted to the surface of the conveyor belt 301, or the like. These encoders can obtain a moving distance in only an integral multiple of a predetermined minimum unit. The rotary encoder 501 outputs a moving distance as an integral value of an encoder pulse unit. The rotary encoder 501 fitted to the drive roller 302 is explained below. However, the type of the rotary encoder is not limited to this.

The rotary encoder 501 outputs a moving distance as an integral value of an encoder pulse unit. The sensor 502 detects the encoder pulse output from the rotary encoder 501, and outputs the encoder pulse to the positioning controlling apparatus 10.

The positioning controlling apparatus 10 has a position determining unit 100, a target speed calculator 101, a current speed calculator 102, a speed error calculator 103, an automatic controller 104, a speed determining unit 105, and a gain switch 106.

The position determining unit 100 compares a moving distance detected by the moving distance detector 500 with a target position, and determines whether the conveyor belt 301 is in a positioning control area in which the positioning controlling apparatus 10 performs the positioning control to stop the conveyor belt 301. The positioning control area is provided for the positioning controlling apparatus 10 to bring the conveyor belt 301 to near a stop position at the beginning and then finely control the position of the conveyor belt 301 accurately to the stop position. The positioning control area is an area of a distance of dozens of microns from the stop position.

The current speed calculator 102 inputs a moving distance from the moving distance detector 500, calculates a current speed based on the input moving distance, and outputs the calculated current speed to the speed error calculator 103 and the speed determining unit 105.

The speed determining unit 105 inputs the current speed from the current speed calculator 102, determines whether the input current speed is positive or negative, and outputs a result of the determination of positive or negative, to the gain switch 106.

The gain switch 106 inputs a result of the determination from the speed determining unit 105, selects a gain corresponding to a determined positive or negative of the current speed, from among plural gains, and outputs the selected gain to the target speed calculator 101.

The target speed calculator 101 inputs moving distance information from the moving distance detector 500, calculates a moving speed of the conveyor belt 301, and inputs the gain switched by the gain switch 106. The target speed calculator 101 generates a target speed by multiplying the input gain to the calculated moving speed of the conveyor belt 301, and outputs the generated target speed to the speed error calculator 103.

The speed error calculator 103 inputs the target speed from the target speed calculator 101, and inputs the current speed from the current speed calculator 102. The speed error calculator 103 generates a speed error as a difference between the input current speed and the input target speed, and outputs the speed error to the automatic controller 104.

The automatic controller 104 inputs the speed error from the speed error calculator 103, calculates a motor drive output, and outputs a motor drive amount as a drive instruction, to the drive motor 200.

Each unit that constitutes the positioning controlling apparatus can be configured by programming a general-purpose computer or a general-purpose digital signal processor (DSP).

Operation of the paper conveying apparatus 1 that uses the positioning controlling apparatus 10 is explained next. The target speed calculator 101 calculates a target speed at each time, using a control starting time as a basis, a current moving distance of the belt, and a current speed.

Figure 2:
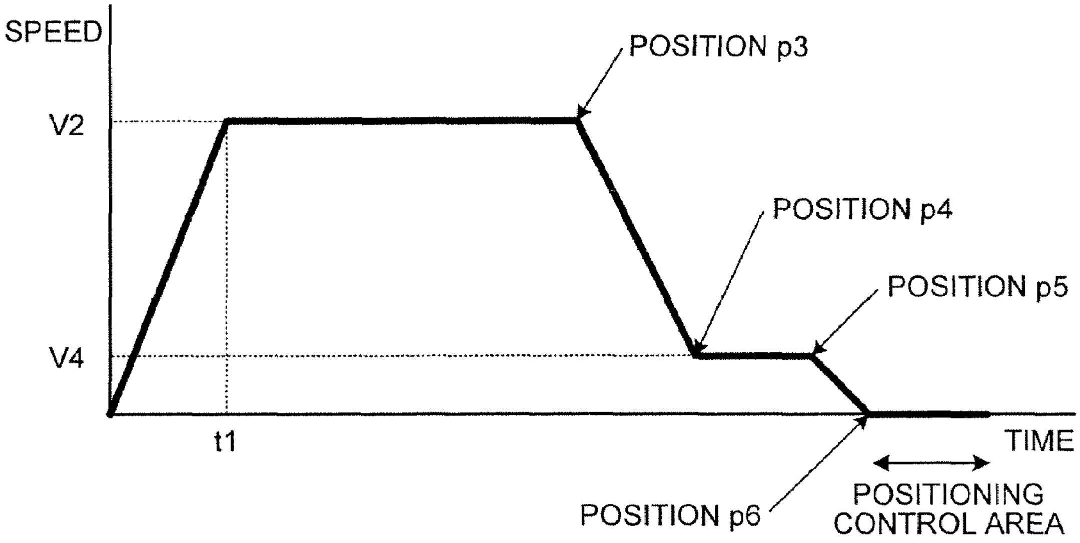
FIG. 2 is a schematic diagram of one example of a target speed calculation algorithm used by a target speed calculator.

FIG. 2 is a schematic diagram of one example of a target speed generation algorithm that is used by the target speed calculator 101. The target speed calculator 101 uses this target speed generation algorithm having substantially a trapezoidal shape, as a target speed generation method. The target speed generation algorithm shown in FIG. 2 employs a sampling time since it is a digital control. The target speed calculator 101 accelerates a target speed at an equal acceleration rate from the control starting time till a predetermined time t1, and switches the acceleration to an equal-speed control upon reaching a predetermined speed v2. Thereafter, the target speed is subjected to a deceleration control expressed by a function of a moving distance, when the moving distance reaches a predetermined level (p3). The target speed is controlled at an equal-speed again when the current speed reaches v4.

When the moving distance reaches a predetermined level p5, the target speed is again subjected to a deceleration control expressed by a function of the moving distance. When the moving distance reaches p6, a position control mode starts, and this mode continues thereafter. A predetermined area near the target position is set as a positioning control area. In the positioning control area, the positioning controlling apparatus 10 controls the position of the conveyor belt 301 so that the position converges to a target stop position.

The position determining unit 100 determines whether the moving distance has reached the positioning control area, based on the moving distance detected by the sensor 502 of the moving distance detector 500, as described above. The current speed calculator 102 obtains the current speed of the conveyor belt 301 based on a difference between adjacent sampling times of the moving distance input from the moving distance detector 500.

When the position determining unit 100 determines that the conveyor belt 301 is not in the positioning control area, the target speed calculator 101 calculates a target speed, based on a target speed obtained with reference to FIG. 2. The speed error calculator 103 calculates an error between the target speed calculated by the target speed calculator 101 and the current speed calculated by the current speed calculator 102.

On the other hand, when the position determining unit 100 determines that the conveyor belt 301 is in the positioning control area, the target speed calculator 101 calculates a target speed by multiplying the gain input from the gain switch 106, to the difference between the target position and the current position. The speed determining unit 105 determines whether the current speed input from the current speed calculator 102 is in the same direction as the rotation direction of the drive motor 200 (positive), or is in the opposite direction to the rotation direction of the drive motor 200 (negative). The speed determining unit 105 outputs a result of the determination of positive or negative, to the gain switch 106.

The gain switch 106 holds plural different gains, selects a corresponding gain following the input determination result, and outputs the selected gain to the target speed calculator 101. For example, the gain switch 106 holds two gains of g1 and g2 (g1<g2). When the input determination result is positive, torque returning from twist is applied. Therefore, g1 having a relatively small value is selected. When the input determination result is negative, torque corresponding to the torque returning from twist needs to be applied. Therefore, g2 having a relatively large value is selected.

The speed error calculator 103 calculates a difference between the target speed and the current speed calculated by the current speed calculator 102, and outputs the difference to the automatic controller 104. The automatic controller 104 controls the drive motor 200, based on the input speed error.

The automatic controller 104 calculates a motor output using a predetermined controller calculation following the input speed error. The automatic control calculation includes a proportional (P) control, a proportional integral (P) control, a proportional integral derivative (PID) control, and a state feedback control. Among the controls, while a stable control result can be obtained by the PI control, the control is not limited to this method.

As described above, in the positioning control area, the drive motor 200 is driven using a calculated speed error by switching a gain, thereby stably and promptly positioning the conveyor belt 301 to a target position.

Figure 3:
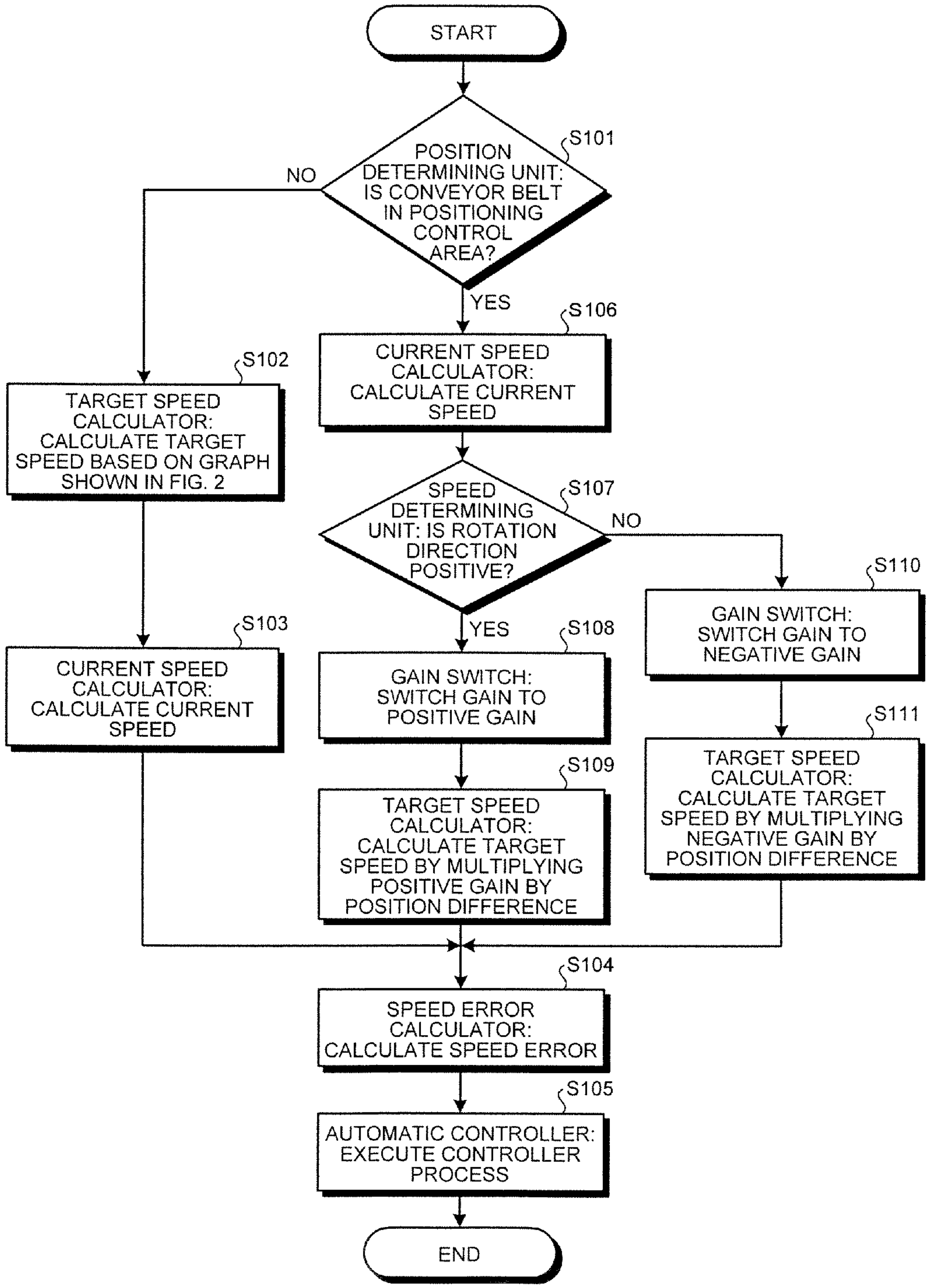
FIG. 3 is a flowchart of a positioning control procedure according to the first embodiment.

FIG. 3 is a flowchart of a positioning control procedure according to the first embodiment. The position determining unit 100 determines whether a moving position of the conveyor belt 301 is in the positioning control area (step S101). When it is determined that a moving position of the conveyor belt 301 is not in the positioning control area (step S101: No), the target speed calculator 101 calculates a target speed in the area outside the positioning control area, based on the algorithm shown in FIG. 2 (step S102). The state that the conveyor belt 301 is not in the control area is the state before the position p6 in FIG. 2.

When the current speed calculator 102 calculates the current speed (step S103), the speed error calculator 103 calculates an error between the calculated target speed and the calculated current speed (step S104). Since the conveyor belt 301 is not in the positioning area, a simple calculation for speed error is performed following the algorithm shown in FIG. 2, without switching between the gains.

The automatic controller 104 controls and drives the drive roller 200 following the speed error calculated by the speed error calculator 103, thereby performing controller process (step S105). As explained above, when the conveyor belt 301 is in the area outside the positioning control area, the speed error is calculated from a target speed obtained by using the algorithm as a speed characteristic determined using a lapse time as a variable, thereby controlling the drive roller. In the area outside the positioning control area, the conveyor belt 301 is quickly brought to the positioning control area near the stop area, without fine adjustment of the speed.

On the other hand, when the position determining unit 100 determines that the moving position of the conveyor belt 301 is in the positioning control area (step S101: Yes), that is, when and after the position determining unit 100 determines that the conveyor belt 301 has moved to the position p6 in FIG. 2, fine positioning process is started. First, the current speed calculator 102 calculates the current speed of the conveyor belt 301 (step S106). The moving distance detector 500 can detect the speed from lapse of time corresponding to the moving distance.

The speed determining unit 105 determines whether the rotation direction of the drive roller 302 is positive (step S107). When it is determined that the rotation direction of the drive roller 302 is positive (step S107: Yes), that is, when the speed determining unit 105 determines that the drive roller 302 is in the same direction as that set as the sub-scan direction, the gain switch 106 switches the gain to the positive gain (step S108). The target speed calculator 101 multiplies the positive gain to the current speed, thereby obtaining a target speed. The current speed can be detected as a position difference. Therefore, the current speed can be calculated by multiplying the positive gain to the current position difference (step S109). The speed error calculator 103 calculates an error between the current speed and the target speed (step S104). The automatic controller 104 controls and drives the drive roller 200 following the speed difference, and controls the conveyor belt 301 (step S105).

On the other hand, when the speed determining unit 105 determines that the rotation direction of the drive roller 302 is not positive (step S107: No), that is, when it is determined that the rotation direction of the drive roller 302 is opposite to the direction set as the sub-scan direction, the gain switch 106 switches the gain to the negative gain (step S110). Then, the target speed calculator 101 multiplies the negative gain to the current speed to obtain a target speed.

The current speed can be detected as a position difference. Therefore, the current speed can be calculated by multiplying the negative gain to the current position difference (step S111). The speed error calculator 103 calculates an error between the current speed and the target speed (step S104). The automatic controller 104 controls and drives the drive roller 200 following the speed difference, and controls the conveyor belt 301 (step S105).

A prescribed gain can be also obtained based on an absolute value of the difference, as well as based on the positive or negative sign of the difference. A finer gain switch becomes possible.

As explained above, the positioning controlling apparatus according to the first embodiment can stably and promptly converge the error due to a torque variation applied to the drive roller 302 that drives the conveyor belt 301, to a target position, by switching the gain to a different gain following the rotation direction of the drive roller.

A positioning controlling apparatus and a paper conveying apparatus using this positioning controlling apparatus according to the second embodiment are explained below. A paper conveying apparatus 2 conveys paper, using the positioning controlling apparatus that moves a conveyor belt in a sub-scan direction by a predetermined distance, in an inkjet image forming apparatus.

Figure 4:
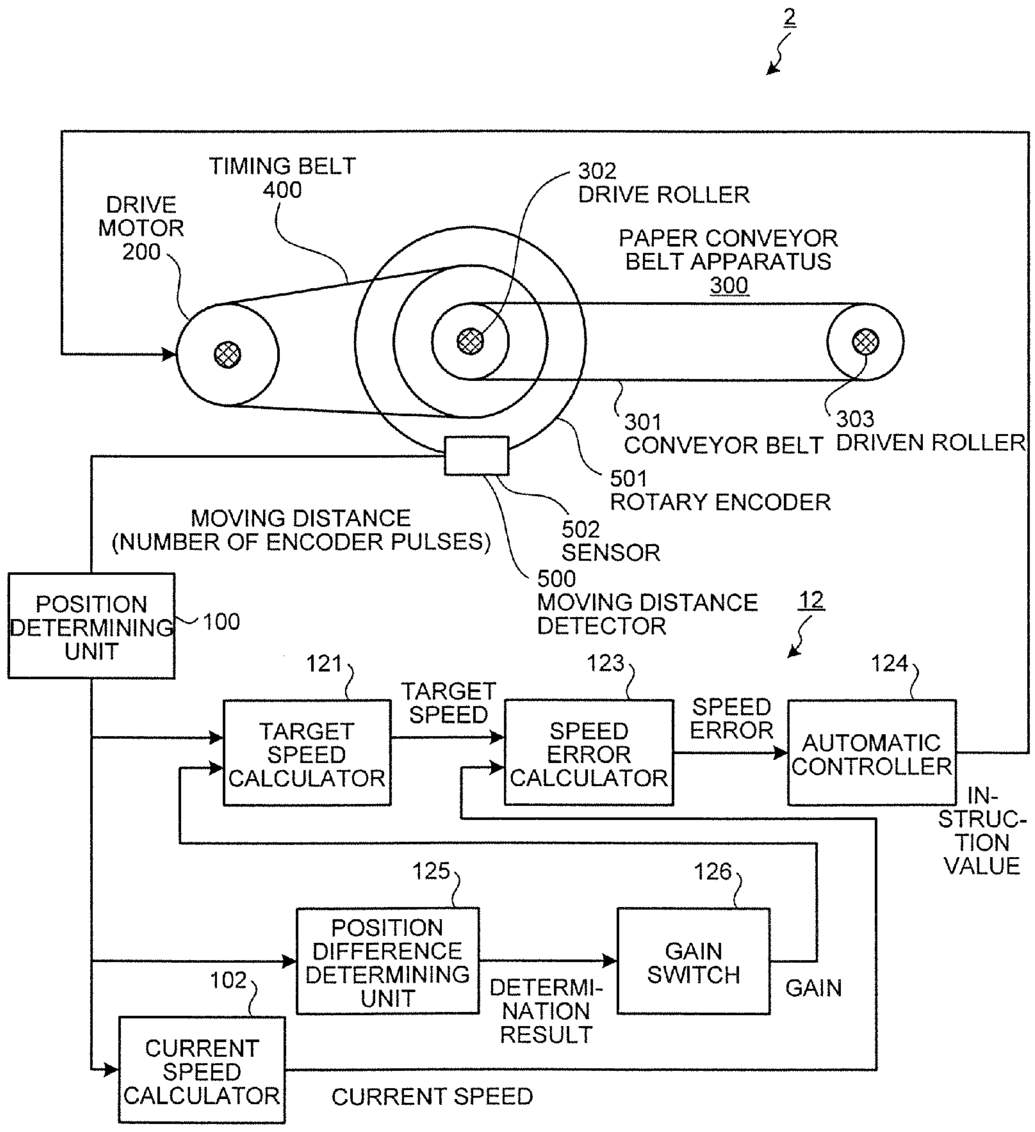
FIG. 4 is a functional block diagram of a paper conveying apparatus to which a positioning controlling apparatus according to a second embodiment of the present invention is applied.

FIG. 4 is a functional block diagram of the paper conveying apparatus to which the positioning controlling apparatus according to the second embodiment is applied. The paper conveying apparatus 2 includes a positioning controlling apparatus 12, a paper conveyor belt apparatus 300, and the moving distance detector 500. Like reference numerals denote like parts having the same configurations and performing the same operation as those in the first embodiment, and their explanation is omitted or is simplified. Points that are different from those in the first embodiment are mainly explained.

The drive motor 200, the paper conveyor belt apparatus 300, the timing belt 400, and the moving distance detector 500 have configurations similar to those in the first embodiment, and therefore, their explanation is omitted.

The positioning controlling apparatus 12 has the position determining unit 100, a target speed calculator 121, the current speed calculator 102, a speed error calculator 123, an automatic controller 124, a position difference determining unit 125, and a gain switch 126.

The position determining unit 100 compares a moving distance detected by the moving distance detector 500 with a target position, and determines whether the conveyor belt 301 is in a positioning control area in which the positioning controlling apparatus 12 performs the positioning control to stop the conveyor belt 301.

The current speed calculator 102 inputs a moving distance from the moving distance detector 500, calculates the current speed based on the input moving distance, and outputs the calculated current speed to the speed error calculator 123.

The position difference determining unit 125 inputs a moving distance from the moving distance detector 500, calculates a difference between the input current position and the target position, determines whether the calculated difference is positive or negative, and outputs a result of the determination of positive or negative, to the gain switch 126.

The gain switch 126 inputs a result of the determination about positive or negative of the difference from the position difference determining unit 125, and outputs a gain corresponding to a result of the determination about positive or negative, to the target speed calculator 121.

The target speed calculator 121 inputs the moving distance from the moving distance detector 500, and inputs the gain from the gain switch 126. The target speed calculator 121 generates a target speed based on the input moving distance and the input gain, and outputs the generated target speed to the speed error calculator 123.

The speed error calculator 123 inputs the target speed from the target speed calculator 121, and inputs the current speed from the current speed calculator 102. The speed error calculator 123 generates a speed error as a difference between the input current speed and the input target speed, and outputs the speed error to the automatic controller 124.

The automatic controller 124 inputs the speed error from the speed error calculator 123, calculates a drive output of the drive motor 200, and outputs the drive output to the drive motor 200.

The positioning controlling apparatus according to the second embodiment constitutes a general closed-loop speed controlling apparatus, except the position difference determining unit 125 and the speed error calculator 123, as is well known to those skilled in the art.

Each unit that constitutes the positioning controlling apparatus 12 can be configured by programming a general-purpose computer or a general-purpose digital signal processor (DSP).

Operation of the paper conveying apparatus 2 that uses the positioning controlling apparatus 12 according to the second embodiment is explained next. The target speed calculator 121 calculates a target speed at each time, using a control starting time as a basis, a moving distance as a current moving amount of the belt, and a current speed. When the conveyor belt 301 is in an area outside the positioning control area, the target speed calculator 121 uses a target speed generation algorithm having substantially a trapezoidal shape as shown in FIG. 2, for a target speed generation method, similarly to the first embodiment.

In the target speed generation algorithm shown in FIG. 2, time in the lateral axis shows a sampling time since it is a digital control. In this target speed generation algorithm, the target speed calculator 121 accelerates a target speed at an equal acceleration rate from the control starting time till a predetermined time t1, and switches the acceleration to an equal-speed control upon reaching a predetermined speed v2. Thereafter, the target speed is subjected to a deceleration control expressed by a function of a moving distance, when the moving distance reaches a predetermined level (p3). The target speed is controlled at an equal-speed again when the current speed reaches v4. When the moving distance reaches a predetermined level p5, the target speed is again subjected to a deceleration control expressed by a function of the moving distance. When the moving distance reaches p6, a position control mode starts, and this mode continues thereafter. The area indicated by time after the position p6 is a positioning control area. Since the positioning control area is the same as that explained in the first embodiment, explanation thereof is omitted.

The position determining unit 100 determines whether the moving distance has reached the positioning control area, based on the moving distance detected by the moving distance detector 500.

In the positioning control area, the gain input from the gain switch 126 is multiplied to a difference between the target speed and the current speed to obtain a target speed, thereby performing the speed control. The current speed calculator 102 obtains the current speed of the conveyor belt 301, based on the difference between adjacent sampling times of the moving distance input from the moving distance detector 500.

The speed error calculator 123 calculates a difference between the target speed generated by the target speed calculator 121 and the current speed generated by the current speed calculator 102, and outputs the speed error.

The position difference determining unit 125 determines the gain as positive when the difference between the input current position and the target position is in an overshoot state, determines the gain as negative when the difference is not in the overshoot state, and outputs a result of the determination to the gain switch 126.

The gain switch 126 holds plural different gains, selects a corresponding gain following the input determination result among plural gains, and outputs the selected gain to the target speed calculator 121. For example, the gain switch 126 holds two gains of g1 and g2 (g1<g2). When the input determination result is negative, that is, not in the overshoot state, torque returning from twist is applied. Therefore, g1 having a relatively small value is selected. When the input determination result is positive, that is, in the overshoot state, torque corresponding to the torque returning from twist needs to be applied. Therefore, g2 having a relatively large value is selected.

The automatic controller 124 calculates the output of the drive motor 200 using a predetermined control calculation, following the speed error input from the speed error calculator 123, even when the conveyor belt 301 is within or outside the positioning control area. The automatic control calculation includes the P control, the PI control, the PID control, and the state feedback control. Among the controls, while a stable control result can be obtained by the PI control, the control is not limited to this method.

Figure 5:
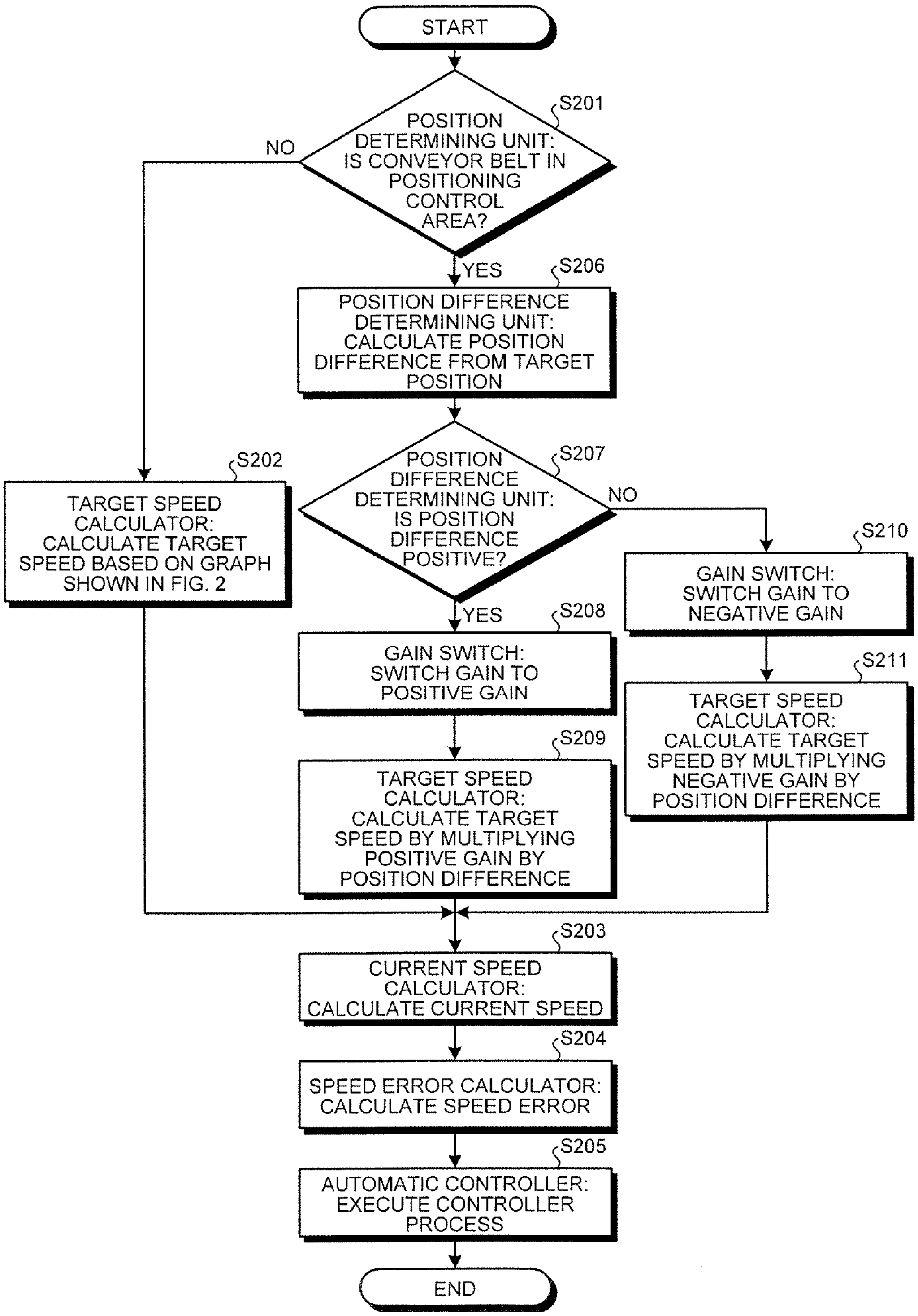
FIG. 5 is a flowchart of a positioning control procedure according to the second embodiment.
Figure 6:
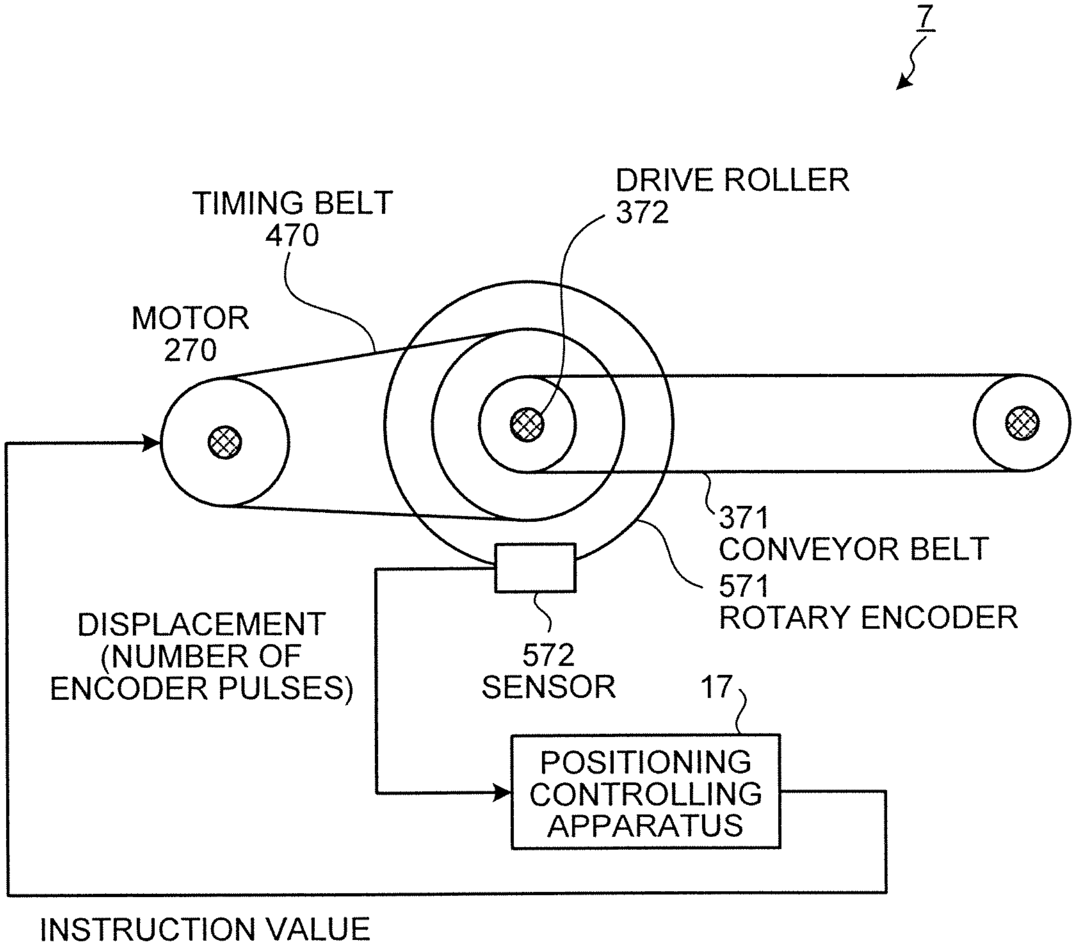
FIG. 6 is an explanatory diagram of motor control of a paper conveying system performed by a conventional positioning controlling apparatus.

FIG. 5 is a flowchart of a positioning control procedure according to the second embodiment. The position determining unit 100 determines whether a moving position of the conveyor belt 301 is in the positioning control area (step S201). When it is determined that a moving position of the conveyor belt 301 is not in the positioning control area (step S201: No), the target speed calculator 121 calculates a target speed in the area outside the positioning control area, based on the algorithm shown in FIG. 2 (step S202). The state that the conveyor belt 301 is not in the control area is the state before the position p6 in FIG. 2.

When the current speed calculator 102 calculates the current speed (step S203), the speed error calculator 123 calculates an error between the calculated target speed and the calculated current speed (step S204). Since the conveyor belt 301 is not in the positioning area in this case, a simple calculation for speed error is performed following the algorithm shown in FIG. 2, without switching between the gains.

The automatic controller 124 controls and drives the drive roller 200 following the speed error calculated by the speed error calculator 123, thereby performing controller process (step S205). As explained above, when the conveyor belt 301 is in the area outside the positioning control area, the speed error is calculated from a target speed obtained by using the algorithm as a speed characteristic determined using a lapse time as a variable, thereby controlling the drive roller. In the area outside the positioning control area, the conveyor belt 301 is quickly brought to the positioning control area near the stop area, without fine adjustment of the speed.

On the other hand, when the position determining unit 100 determines that the moving position of the conveyor belt 301 is in the positioning control area (step S201: Yes), that is, when and after it is determined that the conveyor belt 301 has moved to the position p6 in FIG. 2, fine positioning process is started. First, the position difference determining unit 125 calculates a difference between the target position and the current position of the conveyor belt 301 (step S206). The difference between the positions is calculated, from the moving distance detected by the moving distance detector 500.

The position difference determining unit 125 determines whether the calculated difference is a positive value corresponding to the rotation direction of the drive roller 302 (step S207). When it is determined that the calculated difference is a positive value (step S207: Yes), that is, when the position difference determining unit 125 determines that the conveyor belt 301 is in the same direction as that set as a sub-scan direction, the gain switch 126 switches the gain to the positive gain (step S208). The target speed calculator 121 multiplies the positive gain to the calculated position difference, thereby obtaining a target speed (step S209).

The current speed calculator 102 calculates the current speed (step S203). The speed error calculator 123 calculates an error between the current speed and the target speed (step S204). The automatic controller 124 controls and drives the drive roller 200 following the speed difference, and controls the conveyor belt 301 (step S205).

On the other hand, when the position difference determining unit 125 determines that the calculated difference is not a positive value corresponding to the rotation direction of the drive roller 302 (step S207: No), that is, when it is determined that the conveyor belt 301 is in the direction opposite to that set as a sub-scan direction, the gain switch 126 switches the gain to the negative gain (step S210). The target speed calculator 121 multiplies the negative gain to the calculated position difference, thereby obtaining a target speed (step S211).

The current speed calculator 102 calculates the current speed (step S203), and the speed error calculator 123 calculates an error between the calculated target speed and the calculated current speed (step S204). The automatic controller 124 controls and drives the drive roller 200 following the speed error, thereby performing controller process (step S205).

In the configuration described above, while the position difference determining unit 125 determines the moving direction of the conveyor belt 301, the moving direction can be also determined by inputting positive and negative sign information of the moving speed calculated by the current speed calculator 102. With this arrangement, the current speed calculator 102 can perform the function of the position difference determining unit 125.

A prescribed gain can be also obtained based on an absolute value of the difference, as well as based on the positive or negative sign of the difference. A finer gain switch becomes possible.

As explained above, the positioning controlling apparatus according to the second embodiment has a gain switch that switches the gain, based on a difference between the current position and the target position. With this arrangement, the position of the conveyor belt 301 can be converged to a target position stably and promptly.

Figure 7:
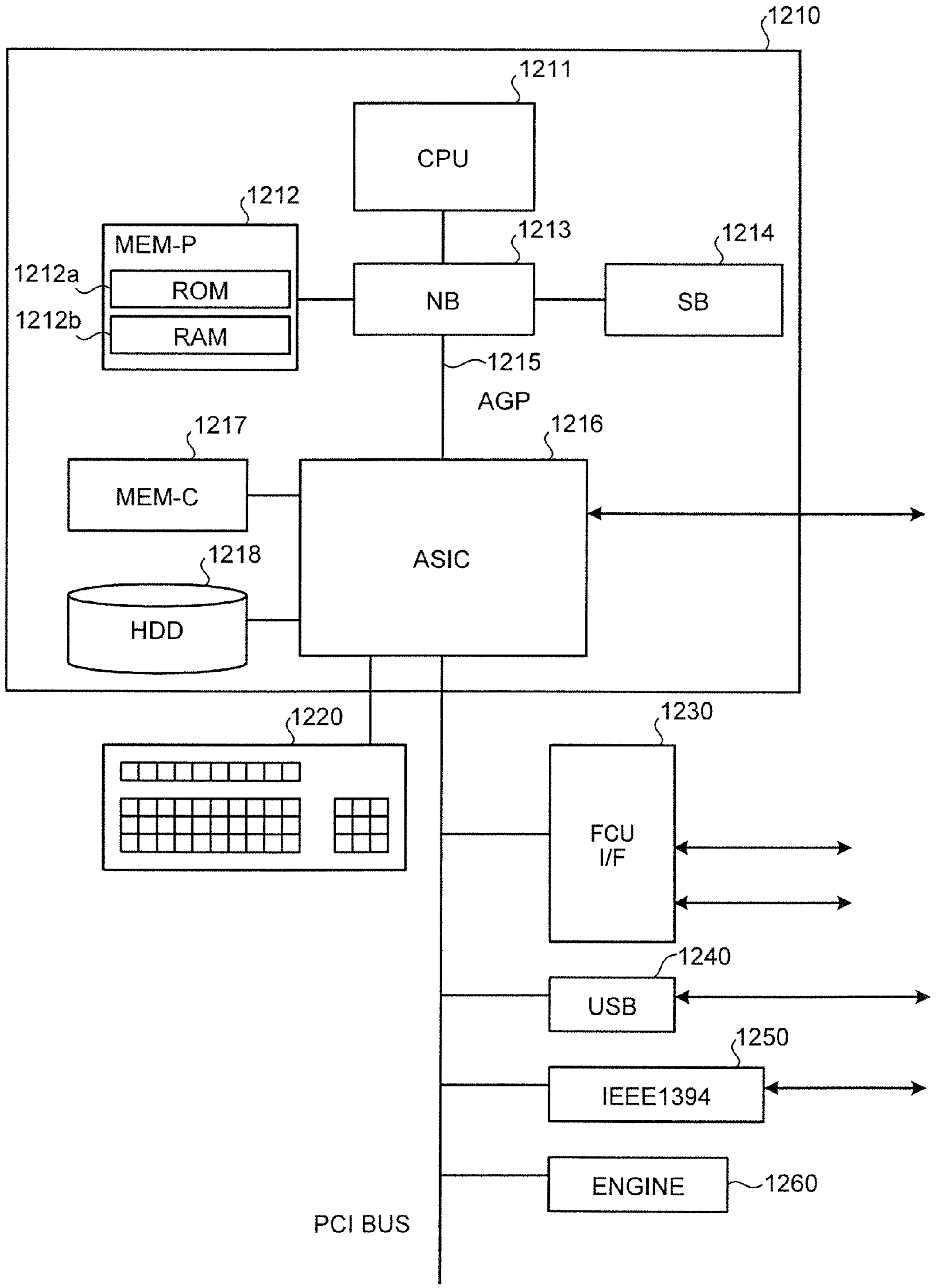
FIG. 7 is a block diagram of a hardware configuration of an inkjet printer.

FIG. 7 is a block diagram of a hardware configuration of an inkjet printer. This inkjet printer is constituted as a multifunction product having multifunction of a facsimile, a scanner, and the like. As shown in FIG. 7, this inkjet printer has a controller 1210 and an engine 1260 connected together via a peripheral component interconnect (PCI) bus. The controller 1210 performs total control of the inkjet printer and controls inputs from an FCU (Facsimile Control Unit) I/F1230 and an operating unit 1220, including display process by a display unit, various controls by a control unit, and image formation by an image forming unit. The engine 1260 is an image processing engine that can be connected to the PCI bus, and includes an image process such as error diffusion and gamma conversion of obtained image data.

The controller 1210 has a CPU 1211, a north bridge (NB) 1213, a system memory (MEM-P) 1212, a south bridge (SB) 1214, a local memory (MEM-C) 1217, an application specific integrated circuit (ASIC) 1216, and a hard disk drive 1218. The north bridge 1213 and the ASIC 1216 are connected together via an accelerated graphics port (AGP) bus 1215. The MEM-P 1212 has a read only memory (ROM) 1212*a*, and a random access memory (RAM) 1212*b*.

The CPU 1211 performs total control of the inkjet printer, has a chip set consisting of the NB 1213, the MEM-P 1212, and the SB 1214, and is connected to other devices via this chip set.

The NB 1213 is a bridge for connecting the CPU 1211 to the MEM-P 1212, the SB 1214, and the AGP 1215, and has a memory controller that controls reading and writing to the MEM-P 1212, a PCI master, and an AGP target.

The MEM-P 1212 is a system memory that is used as a storage memory of a program and data, and as a development memory of a program and data, and consists of the ROM 1212*a* and the RAM 1212*b*. The ROM 1212*a* is used as a storage memory of a program and data. The RAM 1212*b* is a readable and writable memory that is used as a development memory of a program and data, and an image drawing memory at the image processing time.

The SB 1214 is a bridge that connects between the NB 1213, the PCI device, and a peripheral device. This SB 1214 is connected to the NB 1213 via the PCI bus. The PCI bus is also connected to the FCUI/F 1230 and the like.

The ASIC 1216 is an integrated circuit (IC) for multimedia information process having a hardware element for multimedia information process, and functions as a bridge that connects the AGP 1215, the PCI bus, the HDD 1218, and the MEM-C 1217.

The ASIC 1216 is connected to a universal serial bus (USB) 1240 and the Instituted of Electrical and Electronics Engineers (IEEE) 1394 interface 1250 via the PCI bus, among a PCI target and an AGP master, an arbiter (ARB) that forms a core of the ASIC 1216, the memory controller that controls the MEM-C 1217, plural direct memory access controllers (DMAC) that rotate image data based on a hardware logic and the like, and an engine 1060.

The MEM-C 1217 is a local memory that is used as a transmission image buffer and a code buffer. The HDD 1218 is a storage that stores image data, a program, font data, and a form.

The AGP 1215 is a bus interface for a graphics accelerator card that is proposed to increase the graphic processing speed. The AGP 1215 directly accesses the MEM-P 1212 in high throughput, thereby increasing the speed of the graphics accelerator card.

The keyboard 1220 that is connected to the ASIC 1216 receives an operation input from an operator, and transmits received operation input information to the ASIC 1216.

The positioning control program to be executed by the inkjet printer according to this embodiment can be provided by being installed in the ROM or the like in advance.

The positioning control program to be executed by the inkjet printer according to this embodiment can be provided by being recorded in a computer-readable recording medium such as a CD-ROM, a flexible disk (FD), a CD-R, and a digital versatile disk (DVD), in an installable format file or an executable format file.

The positioning control program to be executed by the inkjet printer according to this embodiment can be provided by being stored in a computer connected to a network like the Internet, and downloaded via the network. The positioning control program to be executed by the inkjet printer according to this embodiment can be provided or distributed via the network such as the Internet.

The positioning control program to be executed by the inkjet printer according to this embodiment has a module configuration including the units described above (the position determining unit 100, the target speed calculator 101, the current speed calculator 102, the speed error calculator 103, the automatic controller 104, the speed determining unit 105, and the gain switch 106). As actual hardware, a CPU (processor) reads the positioning control program from the ROM, and executes this program to load each unit in the main storage device. Consequently, the position determining unit 100, the target speed calculator 101, the current speed calculator 102, the speed error calculator 103, the automatic controller 104, the speed determining unit 105, and the gain switch 106 are generated in the main storage device.

Above embodiments and modifications of the present invention are only examples for explanation of the invention and the present invention is not limited to the specific examples explained above.

According to the present invention, there is provided a positioning controlling apparatus that controls a stop position of a conveyor of a conveying apparatus having a driving unit that includes and drives a rotation axis and the conveyor that conveys a conveyed object carrying thereon based on rotation of the rotation axis. A moving distance detector measures a moving distance of the conveyor. A current speed calculator calculates a current speed of the conveyor, from a moving distance. A position determining unit determines whether the conveyor is in a positioning area, from a moving distance. A gain switch switches between gains to be used to calculate a target speed, when the position determining unit determines that the conveyor is in the positioning area. A target speed calculator calculates a target speed of the conveyor based on the gain obtained by switching between the gains. A speed error calculator calculates an error between a target speed and a current speed. A controller controls the driving unit, by using a speed error. With this configuration, the positioning controlling apparatus controls the position of the conveyor in the positioning area while switching between the gains based on the moving speed of the conveyor. Therefore, stable and prompt convergence to a target position is made possible.

According to the present invention, gains are switched following the calculated current speed. With this configuration, the positioning controlling apparatus controls the position of the conveyor while switching between the gains based on the calculated moving speed of the conveyor. Therefore, stable and prompt convergence to a target position is made possible.

According to the present invention, a moving direction determining unit determines a moving direction of the conveyor when the position determining unit determines that the conveyor is in the positioning area. The gain switch switches the gain to a corresponding gain following a determined moving direction. With this configuration, the positioning controlling apparatus controls the position of the conveyor in the positioning area while switching between the gains based on the determined moving direction of the conveyor. Therefore, stable and prompt convergence to a target position is made possible.

According to the present invention, the moving direction determining unit determines the moving direction, based on a calculated current speed. With this configuration, the positioning controlling apparatus controls the position of the conveyor in the positioning area while switching between the gains based on the calculated current speed of the conveyor. Therefore, stable and prompt convergence to a target position is possible.

According to the present invention, the gain switch sets and switches the gain obtained when the moving direction of the conveyor is calculated to be the same as the moving direction of a conveyed object set based on a current speed of the conveyor, to a value smaller than the gain obtained when the moving direction of the conveyor is calculated to be an opposite direction. With this configuration, when the moving direction of the conveyor is the same as the moving direction of the twist of torque, the twist of the torque can be used, in the positioning area. When the moving direction of the conveyor is opposite to the moving direction of the twist of torque, the positioning controlling apparatus controls the position while switching between the gains so as to increase the gain against the twist. Therefore, secure, stable, and prompt convergence to a target position is made possible.

According to the present invention, a difference determining unit determines a difference between a target position and a current position, based on a moving distance of the conveyor. The gain switch switches between the gains, following a determined difference. With this configuration, the positioning controlling apparatus controls the position of the conveyor while switching between the gains, based on a difference between the target position and the current position of the conveyor in the positioning area. Therefore, stable and prompt convergence to a target position is made possible.

According to the present invention, the difference determining unit determines whether a moving direction of the conveyor is the same as a set moving direction of a conveyed object or an opposite moving direction. The gain switch switches between the gains following a determined moving direction. With this configuration, the positioning controlling apparatus controls the position of the conveyor, while switching between the gains based on the moving direction of the conveyor in the positioning area. Therefore, stable and prompt convergence to a target position is possible.

According to the present invention, the gain switch sets the gain obtained when the moving direction of the conveyor is determined to be the same as the moving direction of a conveyed object set based on a speed of the conveyer, to a value smaller than the gain obtained when the moving direction of the conveyor is determined to be the opposite direction, and outputs the obtained gain while switching between the gains. With this configuration, when the moving direction of the conveyor is the same as the moving direction of the twist of torque, the twist of the torque can be used, in the positioning area. When the moving direction of the conveyor is opposite to the moving direction of the twist of torque, the positioning controlling apparatus controls the position while switching between the gains so as to increase the gain against the twist. Therefore, secure, stable, and prompt convergence to a target position is possible.

According to the present invention, there is provided a positioning control method for a positioning controlling apparatus that controls a stop position of a conveyor of a conveying apparatus having a driving unit that includes and drives a rotation axis and the conveyor that conveys a conveyed object based on rotation of the rotation axis. A moving distance of the conveyor is measured at a moving distance detecting step. A current speed of the conveyor is calculated at a current speed calculating step, from a moving distance of the conveyor. Whether the conveyor is in a positioning area is determined at a position determining step, from a moving distance. Gains to be used to calculate a target speed is switched at a gain switching step, when it is determined at the position determining step that the conveyor is in the positioning area. A target speed of the conveyor is calculated at a target speed calculating step based on the gain obtained by switching between the gains. An error between a target speed and a current speed is calculated at a speed error calculating step. The driving unit is controlled at a control step, by using a speed error. With this configuration, the positioning controlling apparatus controls the position of the conveyor while switching between the gains based on the moving speed of the conveyor in the positioning area. Therefore, stable and prompt convergence to a target position is possible.

According to the present invention, gains are switched following the calculated current speed. With this configuration, the positioning controlling apparatus controls the position of the conveyor while switching between the gains based on the calculated moving speed of the conveyor in the positioning area. Therefore, stable and prompt convergence to a target position is possible.

According to the present invention, a moving direction determining unit determines a moving direction of the conveyor when the position determining unit determines that the conveyor is in the positioning area. The gain switch switches the gain to a corresponding gain following a determined moving direction. With this configuration, the positioning controlling apparatus controls the position of the conveyor while switching between the gains based on the determined moving direction of the conveyor in the positioning area. Therefore, stable and prompt convergence to a target position is possible.

According to the present invention, the moving direction determining unit determines the moving direction, based on a calculated current speed. With this configuration, the positioning controlling apparatus controls the position of the conveyor while switching between the gains based on the calculated current speed of the conveyor. Therefore, stable and prompt convergence to a target position is possible.

According to the present invention, the gain switch sets and switches the gain obtained when the moving direction of the conveyor is calculated to be the same as the moving direction if a conveyed object set based on a current speed of the conveyor, to a value smaller than the gain obtained when the moving direction of the conveyor is calculated to be the opposite direction. With this configuration, when the moving direction of the conveyor is the same as the moving direction of the twist of torque, the twist of the torque can be used, in the positioning area. When the moving direction of the conveyor is opposite to the moving direction of the twist of torque, the positioning controlling apparatus controls the position while switching between the gains so as to increase the gain against the twist. Therefore, secure, stable, and prompt convergence to a target position is possible.

According to the present invention, a difference determining unit determines a difference between a target position and a current position, based on a moving distance of the conveyor. The gain switch switches between the gains, following a determined difference. With this configuration, the positioning controlling apparatus controls the position of the conveyor, based on a difference between the target position and the current position of the conveyor while switching between the gains, in the positioning area. Therefore, stable and prompt convergence to a target position is possible.

According to the present invention, the difference determining unit determines whether a moving direction of the conveyor is the same as a set moving direction of a conveyed object or an opposite moving direction. The gain switch switches between the gains following a determined moving direction. With this configuration, the positioning controlling apparatus controls the position of the conveyor, while switching between the gains based on the moving direction of the conveyor in the positioning area. Therefore, stable and prompt convergence to a target position is possible.

According to the present invention, the gain switch sets and switches the gain obtained when the moving direction of the conveyor is determined to be the same as the set moving direction of the conveyed object, to a value smaller than the gain obtained when the moving direction of the conveyor is determined to be the opposite direction, and outputs the obtained gain while switching between the gains. With this configuration, when the moving direction of the conveyor is the same as the moving direction of the twist of torque, the twist of the torque can be used, in the positioning area. When the moving direction of the conveyor is opposite to the moving direction of the twist of torque, the positioning controlling apparatus controls the position while switching between the gains so as to increase the gain against the twist. Therefore, secure, stable, and prompt convergence to a target position is possible.

According to the present invention, there is provided a computer-readable recording medium that stores therein a computer program that causes a computer to execute the positioning control method.

According to the present invention, there is provided an image forming apparatus for a positioning controlling apparatus that controls a stop position of a conveyor of a conveying apparatus having a driving unit that includes and drives a rotation axis and the conveyor that conveys a conveyed object based on rotation of the rotation axis. A moving distance detector measures a moving distance of the conveyor. A current speed calculator calculates a current speed of the conveyor, from a moving distance. A position determining unit determines whether the conveyor is in a positioning area, from a moving distance. A gain switch switches between gains to be used to calculate a target speed, when the position determining unit determines that the conveyor is in the positioning area. A target speed calculator calculates a target speed of the conveyor based on the gain obtained by switching between the gains. A speed error calculator calculates an error between a target speed and a current speed. A controller controls the driving unit, by using a speed error. With this configuration, the positioning controlling apparatus controls the position of the conveyor while switching between the gains based on the moving speed of the conveyor in the positioning area. Therefore, an image forming apparatus that can stably and promptly converge the position of the conveyor to a target position and can perform high-quality image process can be provided.

According to the present invention, gains are switched following the calculated current speed. With this configuration, the positioning controlling apparatus controls the position of the conveyor while switching between the gains based on the calculated moving speed of the conveyor. Therefore, an image forming apparatus that can stably and promptly converge the position of the conveyor to a target position and can perform high-quality image process can be provided.

According to the present invention, a moving direction determining unit determines a moving direction of the conveyor when the position determining unit determines that the conveyor is in the positioning area. The gain switch switches the gain to a corresponding gain following a determined moving direction. With this configuration, the positioning controlling apparatus controls the position of the conveyor while switching between the gains based on the determined moving direction of the conveyor in the positioning area. Therefore, an image forming apparatus that can stably and promptly converge the position of the conveyor to a target position and can perform high-quality image process can be provided.

According to the present invention, there is provided a recording medium that stores the program according to the invention, in a computer-readable state.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A positioning controlling apparatus that controls a stop position of a conveyor of a conveying apparatus, said conveying apparatus having a driving unit that drives a rotation axis and the conveyor that conveys a conveyed object based on rotation of the rotation axis driven by the driving unit, the positioning controlling apparatus comprising:

a moving distance detector that measures a moving distance of the conveyor;

a current speed calculator that calculates a current speed of the conveyor, from the moving distance detected by the moving distance detector;

a position determining unit that determines whether the conveyor is in a positioning area for determining the stop position, from the moving distance detected by the moving distance detector;

a target speed calculator that inputs a gain to be multiplied to the current speed calculated by the current speed calculator, and calculates a target speed of the conveyor;

a gain switch that has a plurality of the gains to be used by the target speed calculator, and outputs a gain to the target speed calculator while switching between the gains, when the position determining unit determines that the conveyor is in the positioning area;

a speed error calculator that calculates an error between the target speed calculated by the target speed calculator and the current speed calculated by the current speed calculator; and a controller that controls the driving unit, by using the speed error calculated by the speed error calculator.

2. The positioning controlling apparatus according to claim 1, wherein the gain switch outputs a gain while switching between the gains following the current speed calculated by the current speed calculator.

3. The positioning controlling apparatus according to claim 1, further comprising a moving direction determining unit that determines a moving direction of the conveyor when the position determining unit determines that the conveyor is in the positioning area, wherein the gain switch outputs a gain while switching the gain to a corresponding gain following the moving direction determined by the moving direction determining unit.

4. The positioning controlling apparatus according to claim 3, wherein the moving direction determining unit determines the moving direction, based on the current speed calculated by the current speed calculator.

5. The positioning controlling apparatus according to claim 4, wherein the gain switch sets the gain obtained when the moving direction of the conveyor is calculated to be the same as the moving direction of the conveyed object set based on the current speed of the conveyor calculated by the current speed calculator, to a value smaller than a gain obtained when the moving direction of the conveyor is calculated to be the opposite direction, and outputs an obtained gain while switching between the gains.

6. The positioning controlling apparatus according to claim 1, further comprising a difference determining unit that determines a difference between a target position and a current position, based on the moving distance of the conveyor detected by the moving distance detector, wherein the gain switch outputs a gain while switching between the gains following the difference determined by the difference determining unit.

7. The positioning controlling apparatus according to claim 6, wherein the difference determining unit determines whether a moving direction of the conveyor is the same as a set moving direction of the conveyed object or an opposite moving direction, and the gain switch outputs a gain while switching between the gains following a moving direction determined by the difference determining unit.

8. The positioning controlling apparatus according to claim 7, wherein the gain switch sets the gain obtained when the moving direction of the conveyor is calculated to be the same as the moving direction of the conveyed object set based on the current speed of the conveyor determined by the difference determining unit, to a value smaller than a gain obtained when the moving direction of the conveyor is determined to be the opposite direction, and outputs the obtained gain while switching between the gains.

9. A positioning controlling method for controlling a stop position of a conveyor, which carries an object to be conveyed and is moved based on rotation of a rotation axis driven by a driving unit, the positioning controlling method comprising:

detecting a moving distance of the conveyor;

calculating a current speed of the conveyor, from the moving distance obtained at the detecting;

determining whether the conveyor is in a positioning area for determining the stop position, from the moving distance obtained at the detecting;

calculating a target speed of the conveyor by inputting a gain to be multiplied to the current speed obtained at the calculating of a current speed;

outputting a gain to be used at the calculating of the target speed while switching between a plurality of gains, when the conveyor is determined to be in the positioning area at the determining, by selecting one of the plurality of gains;

calculating an error between the target speed obtained at the calculating of a target speed and the current speed obtained at the calculating of a current speed; and controlling the driving unit, by using the speed error obtained at the calculating of a speed error.

10. The positioning controlling method according to claim 9, wherein the outputting a gain is performed while switching between a plurality of gains following the current speed obtained at the calculating of a current speed.

11. The positioning controlling method according to claim 9, further comprising determining a moving direction of the conveyor when it is determined at the determining of a position that the conveyor is in the positioning area, wherein the outputting a gain is performed while switching between a plurality of gains to a corresponding gain following the moving direction determined at the determining of a moving direction.

12. The positioning controlling method according to claim 11, wherein the determining of the moving direction is conducted based on the current speed obtained at the calculating of a current speed.

13. The positioning controlling method according to claim 12, wherein the outputting a gain while switching between the gains includes setting the gain obtained when the moving direction of the conveyor is calculated to be the same as the moving direction of the conveyed object set based on the current speed of the conveyor obtained at the calculating of a current speed, to a value smaller than a gain obtained when the moving direction of the conveyor is calculated to be the opposite direction.

14. The positioning controlling method according to claim 9, further comprising determining a difference between a target position and a current position, based on the moving distance of the conveyor obtained at the detecting of a moving distance, wherein the outputting a gain is performed while switching between a plurality of gains following a difference determined at the determining of a difference.

15. The positioning controlling method according to claim 14, wherein the determining is performed to determine whether a moving direction of the conveyor is the same as a set moving direction of the conveyed object or an opposite moving direction, and the outputting a gain is performed while switching between a plurality of gains following the moving direction determined at the determining of a difference.

16. The positioning controlling method according to claim 15, wherein the outputting a gain while switching between the gains includes setting the gain obtained when the moving direction of the conveyor is calculated to be the same as the moving direction of the conveyed object set based on a current speed of the conveyor determined at the determining of a difference, to a value smaller than a gain obtained when the moving direction of the conveyor is determined to be the opposite direction.

17. A computer-readable recording medium that stores therein a computer program that causes a computer to execute a positioning controlling method for controlling a stop position of a conveyor, which carries thereon an object to be conveyed and is moved based on rotation of a rotation axis driven by a driving unit, said positioning controlling method comprising:

detecting a moving distance of the conveyor;

calculating a current speed of the conveyor, from the moving distance obtained at the detecting;

determining whether the conveyor is in a positioning area for determining the stop position, from the moving distance obtained at the detecting;

calculating a target speed of the conveyor by inputting a gain to be multiplied to the current speed obtained at the calculating of a current speed;

outputting a gain to be used at the calculating of a target speed while switching between a plurality of gains, when the conveyor is determined to be in the positioning area at the determining, by selecting one of the plurality of gains;

calculating an error between the target speed obtained at the calculating of a target speed and the current speed obtained at the calculating of a current speed; and controlling the driving unit, by using the speed error obtained at the calculating of a speed error.

18. An image forming apparatus that includes an image processing apparatus that inputs image information and processes the input image, an image output apparatus that outputs an image on recording paper following image information obtained by the image process performed by the image processing apparatus, a conveying apparatus having a driving unit that drives a rotation axis, and a conveyor that conveys the recording paper based on rotation of the rotation axis driven by the driving unit, and a positioning controlling apparatus that controls the conveying apparatus to convey the recording paper to a position where the image output apparatus outputs the image on the recording paper, wherein the positioning controlling apparatus comprises:

a moving distance detector that measures a moving distance of the conveyor;

a current speed calculator that calculates a current speed of the conveyor, from the moving distance detected by the moving distance detector;

a position determining unit that determines whether the conveyor is in a positioning area for determining a stop position, from the moving distance detected by the moving distance detector;

a target speed calculator that inputs a gain to be multiplied to the current speed calculated by the current speed calculator, and calculates a target speed of the conveyor;

a gain switch that has a plurality of the gains to be used by the target speed calculator, and outputs a gain to the target speed calculator while switching between the gains, when the position determining unit determines that the conveyor is in the positioning area;

a speed error calculator that calculates an error between the target speed calculated by the target speed calculator and the current speed calculated by the current speed calculator; and a controller that controls the driving unit, by using the speed error obtained by the speed error calculator.

19. The image forming apparatus according to claim 18, wherein the gain switch outputs a gain while switching between the gains following the current speed calculated by the current speed calculator.

20. The positioning controlling apparatus according to claim 18, further comprising a moving direction determining unit that determines a moving direction of the conveyor when the position determining unit determines that the conveyor is in the positioning area, wherein the gain switch outputs a gain while switching the gain to a corresponding gain following the moving direction determined by the moving direction determining unit.

* * * * *